(12) United States Patent
Lin

(10) Patent No.: US 8,570,672 B2
(45) Date of Patent: Oct. 29, 2013

(54) LENS MODULE

(75) Inventor: Tsung-Yu Lin, New Taipei (TW)

(73) Assignee: Wcube Co., Ltd., George Town (KY)

( * ) Notice: Subject to any disclaimer, the term of this patent is extended or adjusted under 35 U.S.C. 154(b) by 137 days.

(21) Appl. No.: 13/298,305

(22) Filed: Nov. 17, 2011

(65) Prior Publication Data

US 2013/0050850 A1 Feb. 28, 2013

(30) Foreign Application Priority Data

Aug. 29, 2011 (TW) ................................ 100130835

(51) Int. Cl.
*G02B 7/02* (2006.01)
*G02B 9/12* (2006.01)
*G02B 9/00* (2006.01)

(52) U.S. Cl.
USPC ............................ 359/811; 359/784; 359/738

(58) Field of Classification Search
CPC ........ G02B 5/003; G02B 5/005; G02B 7/022; G02B 7/0988
USPC .................. 359/738, 784, 811, 819
See application file for complete search history.

(56) References Cited

U.S. PATENT DOCUMENTS

| 6,072,634 | A * | 6/2000 | Broome et al. | 359/637 |
| 7,088,530 | B1 * | 8/2006 | Recco et al. | 359/811 |
| 7,684,124 | B2 * | 3/2010 | Shinozawa | 359/738 |
| 8,300,328 | B2 * | 10/2012 | Kang et al. | 359/811 |
| 8,363,341 | B2 * | 1/2013 | Chang et al. | 359/819 |
| 2003/0193605 | A1 * | 10/2003 | Yamaguchi | 348/335 |
| 2013/0057957 | A1 * | 3/2013 | Lin | 359/601 |
| 2013/0063822 | A1 * | 3/2013 | Lin | 359/601 |
| 2013/0063831 | A1 * | 3/2013 | Lin | 359/823 |

\* cited by examiner

*Primary Examiner* — David N Spector
(74) *Attorney, Agent, or Firm* — Altis & Wispro Law Group, Inc.

(57) ABSTRACT

A lens module includes a lens barrel, a number of lenses, a number of opaque plates, and a filter glass. The barrel, the lenses, the opaque plates, and the filter glass all are received in the lens barrel. Each opaque plate is sandwiched between two adjacent lenses. Each lens includes an imaging portion and a non-imaging portion surrounding the imaging portion for engaging an inner sidewall of the lens barrel. The filter glass is arranged closer to an image-side of the lens module than the lens and the opaque plates. The projection of one of the opaque plates arranged closest to the filter glass, along the direction of incident light of the lens module, totally covers the non-imaging portion of the lens arranged closest to the filter glass.

9 Claims, 1 Drawing Sheet

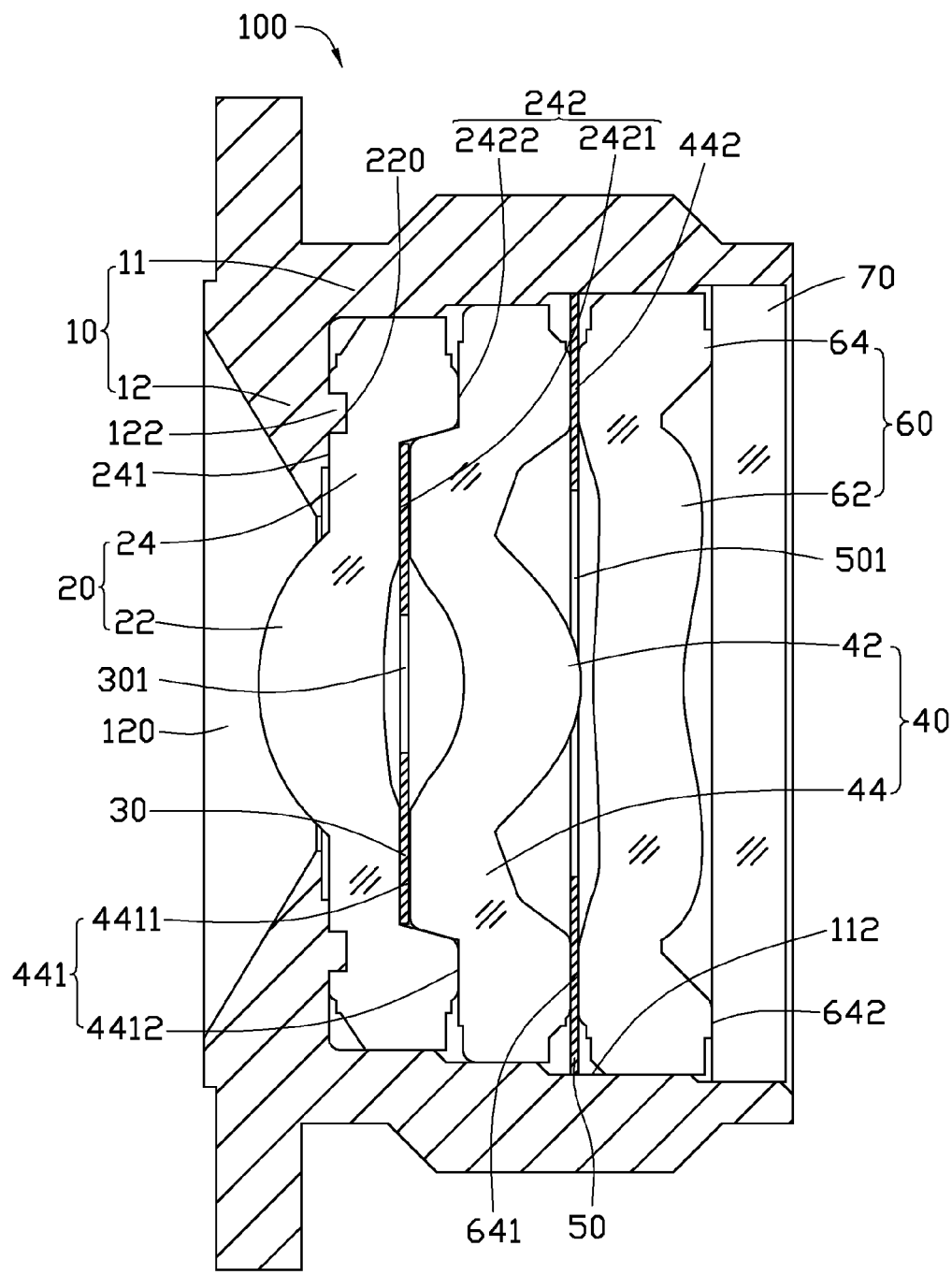

LENS MODULE

BACKGROUND

1. Technical Field

The present disclosure relates to lens modules and, particularly, to a lens module having aperture plates.

2. Description of Related Art

Many lens modules include a first lens, a second lens, and an aperture plate. The aperture plate is disposed between the first lens and the second lens and used for blocking light rays. However, the aperture plate is typically annular and includes an inner cylindrical surface, which may redirect light rays to the second lens and adversely affect the image quality.

Therefore, it is desirable to provide a lens module, which can overcome the limitations described.

BRIEF DESCRIPTION OF THE DRAWINGS

The FIGURE is a cross-sectional schematic view of a lens module of an exemplary embodiment.

DETAILED DESCRIPTION

Embodiments of the disclosure will now be described in detail, with reference to the accompanying drawings.

Referring to the FIGURE, a lens module 100, according to an exemplary embodiment, includes a lens barrel 10, a first lens 20, a first opaque plate 30, a second lens 40, a second opaque plate 50, a third lens 60, and a filter glass 70. The first lens 20, the first opaque plate 30, the second lens 40, the second opaque plate 50, the third lens 60, and the filter glass 70 are received in the barrel 10 in that order from the object-side to the image-side of the lens module 100.

The lens barrel 10 is a hollow cylinder in shape and includes a main body 11 and an aperture plate 12. The aperture plate 12 is positioned at the object-side end of the main body 11 and is integrally formed with the main body 11. The aperture plate 12 defines an aperture opening 120 at the center thereof to allow light rays from an object of interest (not shown) to enter the lens barrel 10. In the illustrated embodiment, the aperture opening 120 tapers towards the image-side of the lens barrel 10, which is beneficial for controlling the incident angle of the entering light rays. The main body 11 includes an inner sidewall 112. The inner sidewall 112 can efficiently absorb light rays it receives, thus improving imaging quality of the lens module 100. In the present embodiment, a first engaging portion 122 is formed on the inner surface of the aperture plate 12. In the embodiment, the first engaging portion 122 is a cylindrical-shaped protrusion perpendicularly protruding from the inner surface of the aperture plate 12. The first engaging portion 122 surrounds the aperture opening 120.

The first lens 20 can be made of plastic or glass. In the present embodiment, the first lens 20 is made of plastic. The first lens 20 includes a first imaging portion 22 and a first non-imaging portion 24. The first imaging portion 22 is convex facing toward the aperture opening 120, and is configured for refracting light rays from an object and allowing them to pass to the second lens 40. The first non-imaging portion 24 surrounds the first imaging portion 22 and is fixed to the inner sidewall 112 of the lens barrel 10. The first non-imaging portion 24 includes a first object-side surface 241 and a first image-side surface 242 opposite to the first object-side surface 241. The first image-side surface 242 is stepped, and includes a first step surface 2421 and a second step surface 2422, both of which are substantially perpendicular to an optical axis of the lens module 100. The first step surface 2421 is connected to the first imaging portion 22. The first lens 20 defines a second engaging portion 220 on the first object-side surface 241 of the first non-imaging portion 24 of the first lens 20. In the embodiment, the second engaging portion 220 is a cylindrical-shaped groove and corresponds to the protrusion 122. The protrusion 122 of the lens barrel 10 fittingly engages with the groove 220 to hold the first lens 20 to the inner sidewall of the annular aperture plate 12.

In alternative embodiments, the position of the first engaging portion 122 and the second engaging portion 220 can be interchanged, that is, each first engaging portion 122 is a cylindrical-shaped groove, while each second engaging portion 220 is a cylindrical-shaped protrusion.

The first opaque plate 30 is non-reflective. The first opaque plate 30 defines a first through hole 301 corresponding to the first imaging portion 22, at a center of the first opaque plate 30. The first opaque plate 30 is positioned on the first step surface 2421 of the first lens 20 and configured for blocking incident light rays passing through the first non-imaging portion 24 from entering the lens module 100, thereby improving the imaging quality of the lens module 100.

The second lens 40 can be also made of plastic or glass, and includes a second imaging portion 42 and a second non-imaging portion 44 surrounding the imaging portion 42. In the embodiment, the second lens 40 is made of plastic. The second imaging portion 42 is concave facing toward the first lens 20 and can be spherical or aspherical. The second imaging portion 42 is configured for refracting incident light rays. The second non-imaging portion 44 is fixed to the inner sidewall 112 of the lens barrel 10. The second non-imaging portion 44 includes a second object-side surface 441 and a second image-side surface 442 opposite to the second object-side surface 441. The second object-side surface 441 is also stepped, and includes a third step surface 4411 corresponding to the first step surface 2421 and a fourth step surface 4412 corresponding to the second step surface 2422, both of which are substantially perpendicular to the optical axis of the lens module 100. The third step surface 4411 is connected to the second imaging portion 42. Upon assembly, the first step surface 2421 abuts the third step surface 4411 and the second step surface 2422 abuts the fourth step surface 4412, this can improve assembly accuracy.

The second opaque plate 50 is non-reflective. The second opaque plate 50 defines a second through hole 501 corresponding to the second imaging portion 42 of the second lens 40, at a center of the second opaque plate 50. The second opaque plate 50 is positioned on the second image-side surface 442 of the second lens 40 and configured for blocking incident light rays passing through the second non-imaging portion 44 from entering the lens module 100, thereby improving the imaging quality of the lens module 100.

The third lens 60 can also be made of plastic or glass, and includes a third imaging portion 62 and a third non-imaging portion 64. The third imaging portion 62 is convex facing toward the second lens 40, and can be spherical or aspherical. The third imaging portion 62 is configured for refracting light rays passing therethrough, and cooperates with the imaging portion 22 of the first lens 20 and the imaging portion 42 of the second lens 40 to form the image of the object. The third non-imaging portion 64 includes a third object-side surface 641 abutting against the second opaque plate 50. In the embodiment, the effective aperture of the third imaging portion 62 is larger than that of the second imaging portion 42 and that of the first imaging portion 22. The projection of the second opaque plate 50 along the direction of incident light of the lens module 100, totally covers the third non-imaging portion 64 of the third lens 60.

The filter glass 70 is disposed in the lens barrel 10 and abuts against the third image-side surface 642 of the third lens 60, and is configured for filtering light from the first lens 20, the second lens 40, and the third lens 60.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A lens module, comprising:
   a lens barrel, the lens barrel being a hollow cylinder in shape and comprising a main body and an aperture plate connected to the main body, the aperture plate positioned at an object-side end of the main body, the aperture plate comprising a cylindrical-shaped protrusion perpendicularly protruding from an inner surface of the aperture plate; and
   a first lens comprising a first imaging portion and a first non-imaging portion surrounding the first imaging portion, the first non-imaging portion comprising a first object-side surface and a first image-side surface opposite to the first object-side surface, the first lens defining a cylindrical-shaped groove corresponding to the protrusions, the protrusion fittingly engaging with the groove to hold the first lens to the inner sidewall of the aperture plate.

2. The lens module of claim 1, wherein the annular aperture plate is integrally formed with the main body.

3. The lens module of claim 1, wherein the annular aperture plate defines an aperture opening at the center of the annular aperture plate to allow light rays from an object of interest to enter the lens barrel, the aperture opening tapers towards the image-side of the lens module.

4. The lens module of claim 1, comprising a second lens, wherein the first image-side surface is stepped, and comprises a first step surface and a second step surface, the second lens comprises an second imaging portion and a second non-imaging portion surrounding the imaging portion, the second non-imaging portion comprises a second object-side surface and a second image-side surface opposite to the second object-side surface, the second object-side surface is also stepped, and comprises a third step surface and a fourth step surface, the first step surface abuts the third step surface, and the second step surface abuts the fourth step surface.

5. The lens module of claim 4, comprising a first opaque plate, wherein the first opaque plate defines a first through hole corresponding to the first imaging portion, at a center of the first opaque plate, the first opaque plate is positioned on the first step surface and configured for blocking incident light rays passing through the first non-imaging portion from entering the lens module.

6. The lens module of claim 5, comprising a third lens, wherein the third lens comprises a third imaging portion and a third non-imaging portion surrounding the third imaging portion, the effective aperture of the third imaging portion is larger than that of the second imaging portion and that of the first imaging portion.

7. The lens module of claim 6, further comprising a second opaque plate, wherein the second opaque plate defines a second through hole corresponding to the second imaging portion of the second lens, at a center of the second opaque plate, the second opaque plate is positioned on the second image-side surface of the second lens.

8. The lens module of claim 7, wherein the projection of the second opaque plate along the direction of the incident light of the lens module, totally covers the third non-imaging portion of the third lens.

9. The lens module of claim 7, comprising a filter glass, wherein the filter glass abuts against the third image-side surface of the third lens, and is configured for filtering light from the first lens, the second lens, and the third lens.

* * * * *